(12) United States Patent
Chi et al.

(10) Patent No.: US 7,474,535 B2
(45) Date of Patent: Jan. 6, 2009

(54) REPLACEABLE LIQUID CRYSTAL DISPLAY BACK PLATE FOR PORTABLE COMPUTER

(75) Inventors: Chin-Jui Chi, Bade (TW); Po-Yu Lin, Sindian (TW)

(73) Assignee: Mitac Technology Corp., Hsin-Chu Hsien (TW)

( * ) Notice: Subject to any disclaimer, the term of this patent is extended or adjusted under 35 U.S.C. 154(b) by 0 days.

(21) Appl. No.: 11/902,971

(22) Filed: Sep. 27, 2007

(65) Prior Publication Data
US 2008/0019089 A1    Jan. 24, 2008

Related U.S. Application Data

(63) Continuation-in-part of application No. 11/062,841, filed on Feb. 23, 2005, now Pat. No. 7,292,434.

(51) Int. Cl.
*H05K 5/00* (2006.01)
(52) U.S. Cl. .................. 361/724; 349/153; 362/633; 455/575.5
(58) Field of Classification Search ......... 349/153, 349/62, 58–59; 345/582, 905, 173, 102; 362/607, 609, 633; 252/299.63; 455/572, 455/575.7; 361/679–687, 724–727
See application file for complete search history.

(56) References Cited

U.S. PATENT DOCUMENTS

| | | | |
|---|---|---|---|
| 7,292,434 B2 * | 11/2007 | Chi | 361/681 |
| 2005/0225694 A1 * | 10/2005 | Akagawa et al. | 349/58 |
| 2006/0236015 A1 * | 10/2006 | Tsuji | 710/303 |

* cited by examiner

*Primary Examiner*—Hung V Duong
(74) *Attorney, Agent, or Firm*—Quintero Law Office

(57) ABSTRACT

A replaceable liquid crystal display back plate for portable computer includes a back plate forming part of a housing of a liquid crystal display of a portable computer and being provided on an outer surface with a flat area. The flat area has a pair of outer edges provided at two opposed laterally outer sides of the flat area on the back plate, and a plurality of notches formed on the outer edges. A guide mechanism includes a plurality of L-shaped tabs provided at two laterally inner sides of the replaceable cover plate corresponding to the outer edges formed on the flat area of the back plate. When the replaceable cover plate is vertically downward set in the flat area on the back plate, the L-shaped tabs of the replaceable cover plate pass the notches of the back plate and then the replaceable cover plate is horizontally slid along the outer edges, so that the replaceable cover plate covers on the flat area of the back plate.

9 Claims, 12 Drawing Sheets

REPLACEABLE LIQUID CRYSTAL DISPLAY BACK PLATE FOR PORTABLE COMPUTER

CROSS-REFERENCES TO RELATED APPLICATIONS

This application is a continuation-in-part of Ser. No. 11/062,841 filed on Feb. 23, 2005, now U.S. Pat. No. 7,292,434 entitled "Replaceable Liquid Crystal Display Back Plate for Portable Computer".

FIELD OF THE INVENTION

The present invention relates to an improvement made to a liquid crystal display (LCD) for portable computer, and more particularly to a replaceable LCD back plate for portable computer.

BACKGROUND OF THE INVENTION

A display is an important output device for a computer system, via which a user could know and control the current operating state of the computer system and give instructions to the computer system based on the data and messages shown on the display. Currently, most of the available portable computers use a liquid crystal display (LCD). The LCDs used with the conventional portable computers provide only one simple function of displaying information. Therefore, the current LCDs usually have a housing designed to provide a room for an LCD panel, various circuit components, and necessary structural parts thereof.

In recent years, there have been many improvements made to the LCDs in an attempt to enhance their display function and increase their added value.

However, it is difficult to have any breakthrough in the design of the LCD housing for portable computer due to the limitation on space set by the electronic circuits and other structural parts of the LCD to the housing thereof.

Meanwhile, since compact volume and low weight are two important factors being considered by consumers when they purchase a portable computer, most portable computer manufacturers would not particularly add too many functional members to the LCD that would increase the volume and weight of the LCD. Instead, the manufacturers would only utilize as much as possible the limited space available from the current LCD housing.

Under this circumstance, a personalized design for the LCD housing has become an important approach to break through the conventional structural design for the LCD and to increase the added value thereof.

SUMMARY OF THE INVENTION

It is therefore a primary object of the present invention to provide a replaceable liquid crystal display (LCD) back plate for portable computer, so that a user may freely show different colors, pictures, or shapes on the LCD back plate.

Another object of the present invention is to provide a replaceable liquid crystal display (LCD) back plate for portable computer, so that a portable computer has diversified appearances to effectively attract consumers.

A further object of the present invention is to provide a replaceable liquid crystal display (LCD) back plate for portable computer, so that a portable computer may have a personalized appearance simply by associating the LCD back plate with a user's most favorite colors, pictures, photos, etc.

To achieve the above and other objects, the replaceable liquid crystal display (LCD) back plate for portable computer according to the present invention includes a back plate forming part of a housing of an LCD of a portable computer and being provided on an outer surface with a flat area. The flat area has a pair of outer edges provided at two opposed laterally outer sides of the flat area on the back plate, and a plurality of notches formed on the outer edges. A guide mechanism includes a plurality of L-shaped tabs provided at two laterally inner sides of the replaceable cover plate corresponding to the outer edges formed on the flat area of the back plate. When the replaceable cover plate is vertically downward set in the flat area on the back plate, the L-shaped tabs of the replaceable cover plate pass the notches of the back plate and then the replaceable cover plate is horizontally slid along the outer edges, so that the replaceable cover plate covers on the flat area of the back plate.

In a preferred embodiment of the present invention, the replaceable cover plate is made of a transparent material, and a pictorial layer may be provided between the replaceable cover plate and the flat recess.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
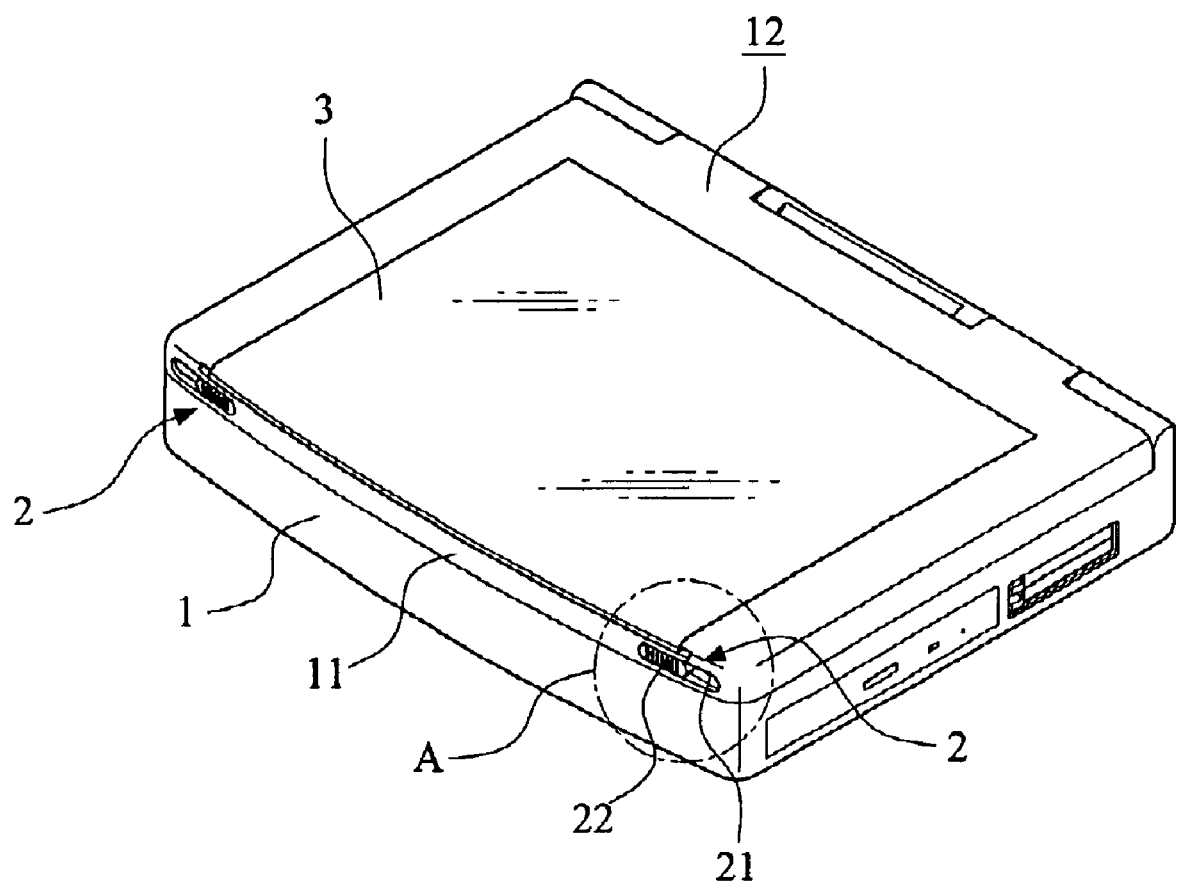
FIG. 1 is an assembled perspective view of a replaceable liquid crystal display (LCD) back plate for portable computer according to a first embodiment of the present invention.
Figure 2:
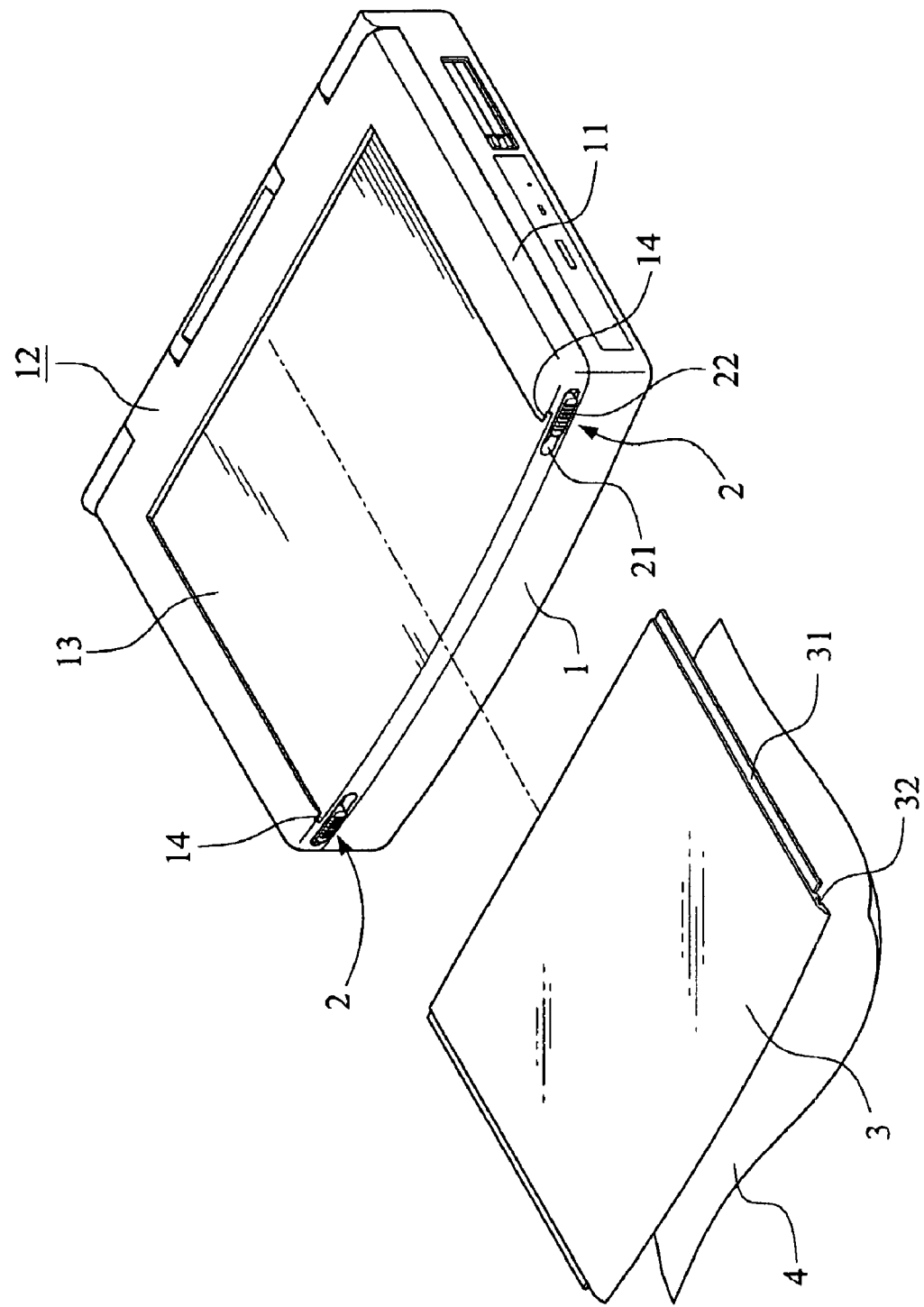
FIG. 2 is an exploded perspective view showing a replaceable cover plate of the LCD back plate for portable computer of FIG. 1 is separated from the LCD back plate.

Please refer to FIGS. 1 and 2 that are assembled and exploded perspective views, respectively, of a replaceable liquid crystal display (LCD) back plate for portable computer according to a first embodiment of the present invention. As shown, the present invention mainly includes a back plate 12 forming part of a housing of a LCD 11 of a portable computer 1. The back plate 12 is provided on an outer surface with a flat recess 13, to which a replaceable cover plate 3 is detachably locked via a locking mechanism. The flat recess 13 may occupy the whole area or only a part of the outer surface of the back plate 12 of the LCD 11.

In the illustrated first embodiment, the locking mechanism includes a guide way 14 provided at each of two opposed laterally inner sides of the flat recess 13, and a locking gear 2 provided near a front end of each guide way 14. Since the two locking gears 2 are symmetrically provided in the present invention, only one of them is described in details herein.

The replaceable cover plate 3 is dimensioned for fitly setting in and thereby covering the whole flat recess 13 on the back plate 12 of the LCD 11, and is provided at two laterally outer sides with a guide rail 31 each to correspond to the guide way 14 of the flat recess 13. Thus, the replaceable cover plate 3 may be manually operated to slide into the flat recess 13 through engagement of the guide rails 31 with the guide ways 14 to flush with the outer surface of the back plate 12 of the LCD 11.

Figure 3:
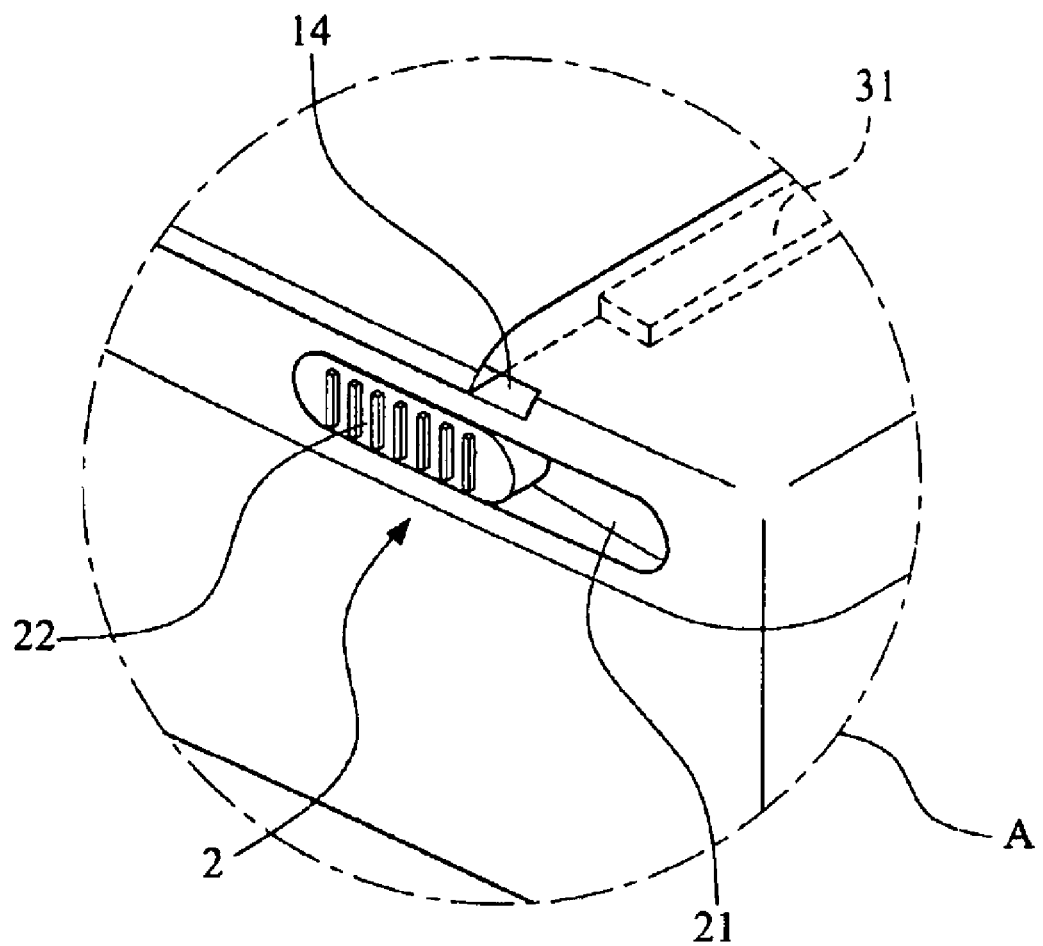
FIG. 3 is an enlarged view of the encircled area A in FIG. 1.
Figure 4:
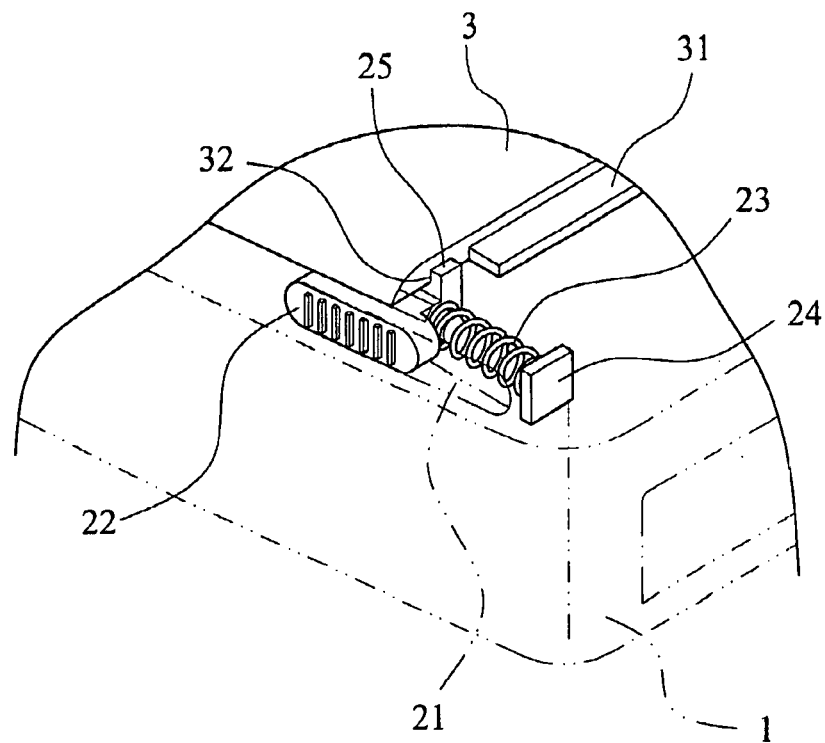
FIG. 4 is a fragmentary and enlarged perspective view of a locking gear for the present invention in a locked position to lock the replaceable cover plate to the LCD back plate for portable computer.
Figure 5:
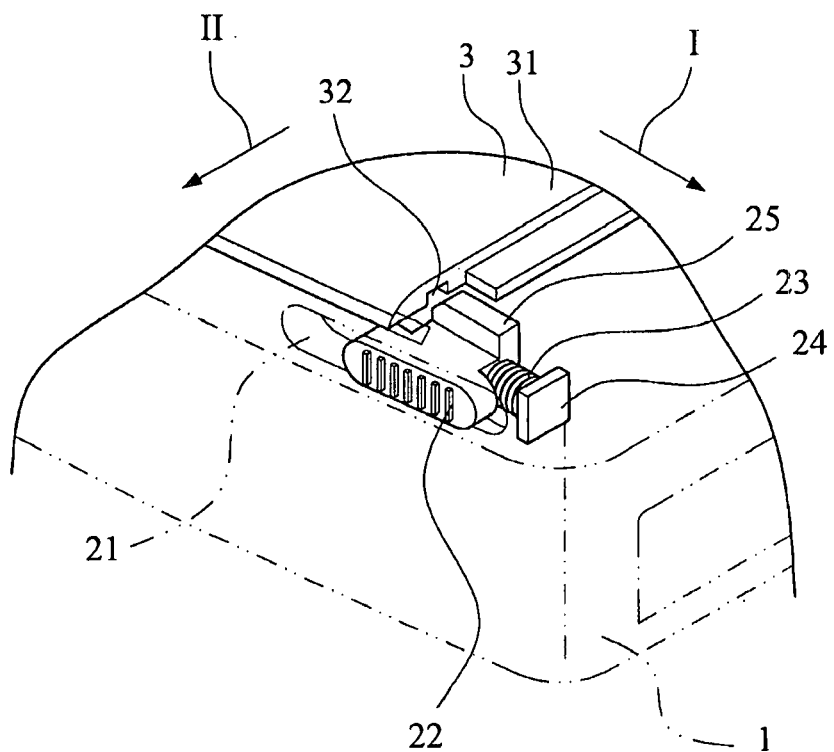
FIG. 5 is a fragmentary and enlarged perspective view of the locking gear for the present invention in an unlocked position to allow separation of the replaceable cover plate from the LCD back plate for portable computer.

Please refer to FIG. 3 that is an enlarged view of the encircled area A of FIG. 1 showing the locking gear 2, and to FIGS. 4 and 5 that show the locking gear 2 in a locked and an unlocked position, respectively.

The locking gear 2 includes a slot 21 provided at a front outer end of the back plate 12 of the LCD 11, a slide 22 movably mounted in the slot 21 to be manually operated by a user to laterally slide in the slot 21, and an elastic element 23 located behind the slot 21 and the slide 22 with an end pressed against a rear lateral side of the slide 22 and the other end pressed against a fixed location inside the housing of the LCD 11, such as a stopper 24 or a suitable point in the housing of the LCD 11.

The slide 22 not subjected to an external force from a user is normally pushed by the elastic element 23 to a locked position (it is the left end of the slot 21 in FIG. 4). However, when the slide 22 is laterally pushed outward in the slot 21 to an unlocked position (it is the right end of the slot in FIG. 5), the slide 22 would compress the elastic element 23 against the stopper 24.

The slide 22 is provided at a rear upper surface with an upward projected rib 25. When the slide 22 is in the locked position as shown in FIG. 4, the projected rib 25 is located in and fitly engaged with a retaining recess 32 provided at each lateral side of the replaceable cover plate 3 near a lower front edge thereof. And, when the slide 22 is in the unlocked position as shown in FIG. 5, the projected rib 25 is disengaged from and located outside the retaining recess 32.

In a preferred embodiment of the present invention, the replaceable cover plate 3 is made of a transparent material, and a pictorial layer 4 is provided and interposed between the replaceable cover plate 3 and the flat recess 13 on the back plate 12 of the LCD 11. The pictorial layer 4 may be selected from the group consisting of differently printed ornamental pictures, photos, company logos, words, geometrical patterns, scenic pictures showing different seasons, and differently colored sheets. Alternatively, the pictorial layer 4 may be attached to or sandwiched in the replaceable cover plate 3, so that a user may create changeful visual effects for the back plate 12 of the LCD 11 simply by changing the pictorial layer 4. It is also possible for a user to form the pictorial layer 4 by directly painting, printing, or putting a label on one surface of the replaceable cover plate 3.

When the slide 22 is moved to the locked position as shown in FIG. 4, the locking gear 2 is adapted to firmly hold the replaceable cover plate 3 to the flat recess 13 on the back plate 12 of the LCD 11. And, when the slide 22 is pushed in a first direction I to the unlocked position as shown in FIG. 5, the projected rib 25 of the slide 22 is disengaged from the retaining recess 32 on the replaceable cover plate 3, and a user may slide the replaceable cover plate 3 in a second direction II to move the same out of the guide ways 14 at two laterally inner sides of the flat recess 13, so that another one of desired replaceable cover plate may be slid into the guide ways 14 to associate with the flat recess 13 on the back plate 12 and be locked in place using the locking gears 2, ax shown in FIG. 4.

Figure 6:
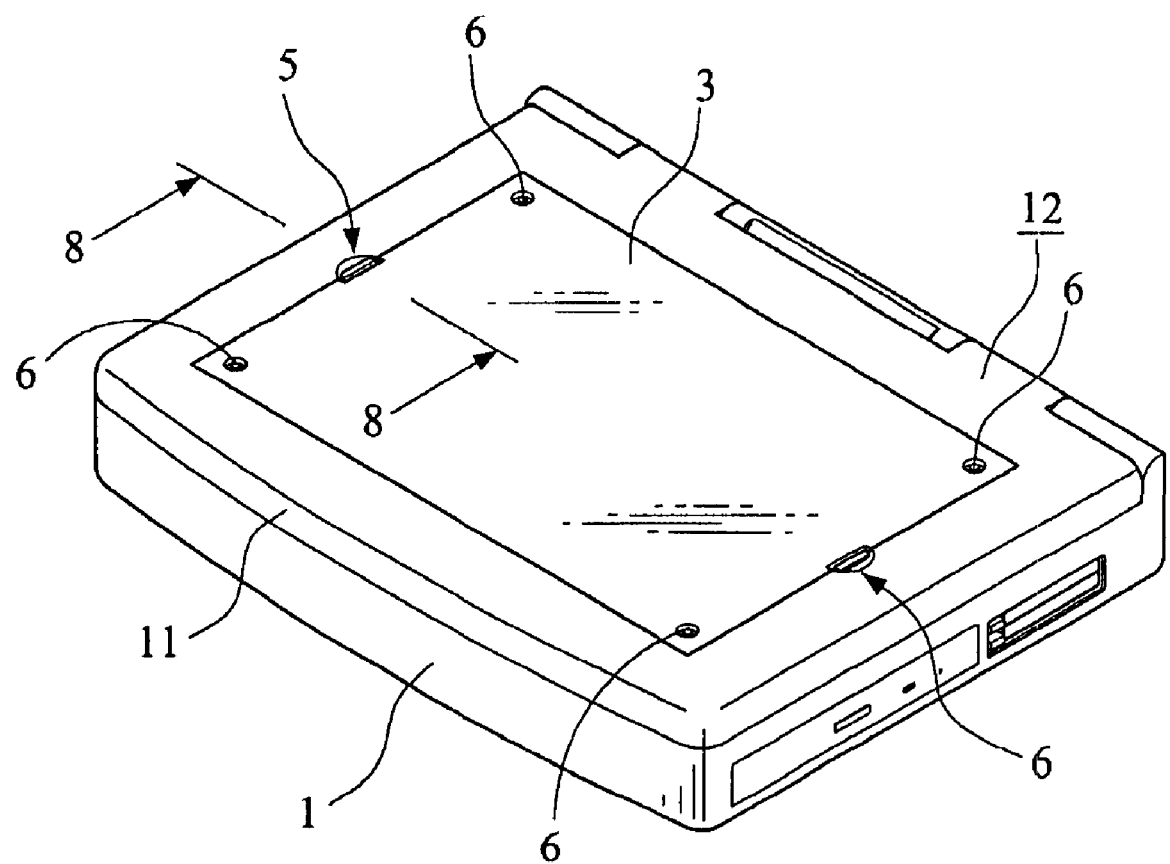
FIG. 6 is an assembled perspective view of a replaceable LCD back plate for portable computer according to a second embodiment of the present invention.
Figure 7:
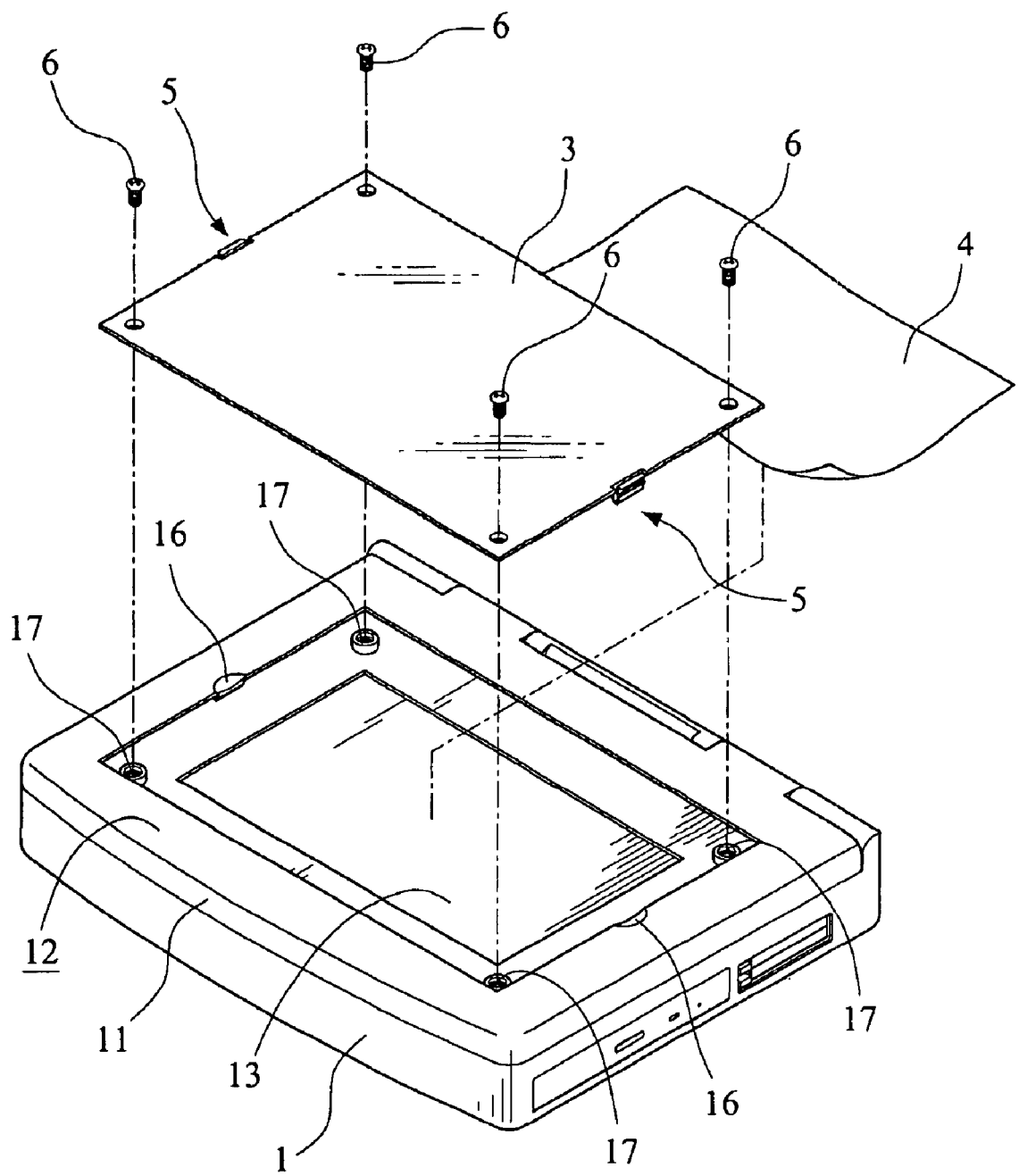
FIG. 7 is an exploded perspective view showing a replaceable cover plate of the LCD back plate for portable computer of FIG. 6 is separated from the LCD back plate.
Figure 8:
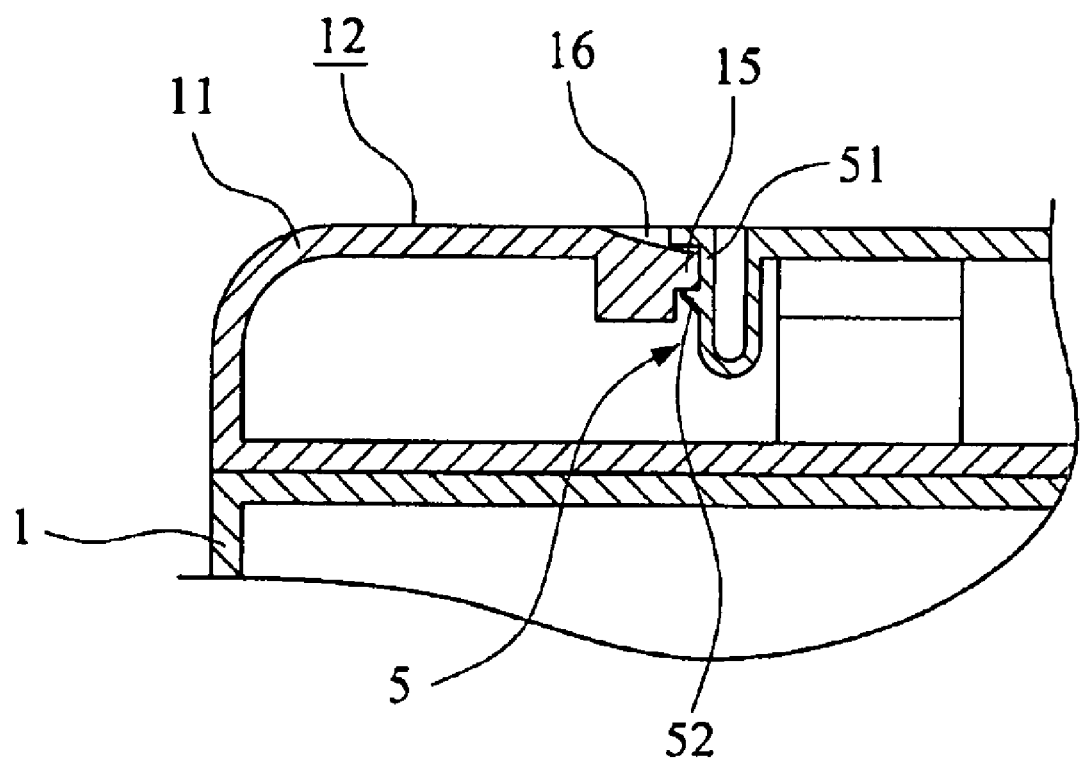
FIG. 8 is an enlarged sectional view taken along line 8-8 of FIG. 6.

FIGS. 6 and 7 are assembled and exploded perspective views, respectively, of a replaceable LCD back plate for portable computer according to a second embodiment of the present invention; and FIG. 8 is a fragmentary and enlarged sectional view taken along line 8-8 of FIG. 6. In the second embodiment, structural members identical or similar to those in the first embodiment are denoted with reference numerals the same as that used in the first embodiment.

In the second embodiment, the back plate 12 forming part of the housing of the LCD 11 for the portable computer 1 is also provided on an outer surface with a flat recess 13, to which a replaceable cover plate 3 is detachably locked via a locking mechanism. As in the first embodiment, a pictorial layer 4 may be provided between the replaceable cover plate 3 and the flat recess 13 on the LCD back plate 12.

The locking mechanism in the second embodiment includes a pair of elastic fasteners 5 separately and correspondingly mounted to two opposite lateral outer sides of the replaceable cover plate 3. Please refer to FIG. 8. Each of the elastic fasteners 5 includes a spring plate 51, and a barb section 52 formed at a laterally outer side of the spring plate 51. The locking mechanism also includes a catch 15 provided on the LCD back plate 12 at each laterally outer side thereof corresponding to the elastic fastener 5. An inward and downward curved recess 16 is formed immediately above the catch 15 close to the elastic fastener 5.

When the replaceable cover plate 3 is vertically downward set in the flat recess 13 on the LCD back plate 12, the barb sections 52 of the two elastic fasteners 5 pass the catches 15 on the back plate 12 and are then retained thereto to firmly lock the replaceable cover plate 3 to the flat recess 13 and accordingly the back plate 12 of the LCD 11. And, when it is desired to remove the replaceable cover plate 3 and replace it with another one, simply laterally inward push the spring plates 51 of the two elastic fasteners 5 at the same time to disengage the barb sections 52 from the catches 15 on the back plate 12 of the LCD 11. At this point, the whole replaceable cover plate 3 could be easily lifted from the flat recess 13. The curved recesses 16 enable a user to easily contact with and inward push the spring plates 51 of the elastic fasteners 5 to lift the replaceable cover plate 3.

In addition to the elastic fasteners 5, a plurality of locking screws 6 may be further provided to screw through holes provided at predetermined points on the replaceable cover plate into internally threaded posts 17 correspondingly provided on the flat recess 13, so as to more firmly lock the replaceable cover plate 3 to the flat recess 13 on the back plate 12 of the LCD 11.

Figure 9:
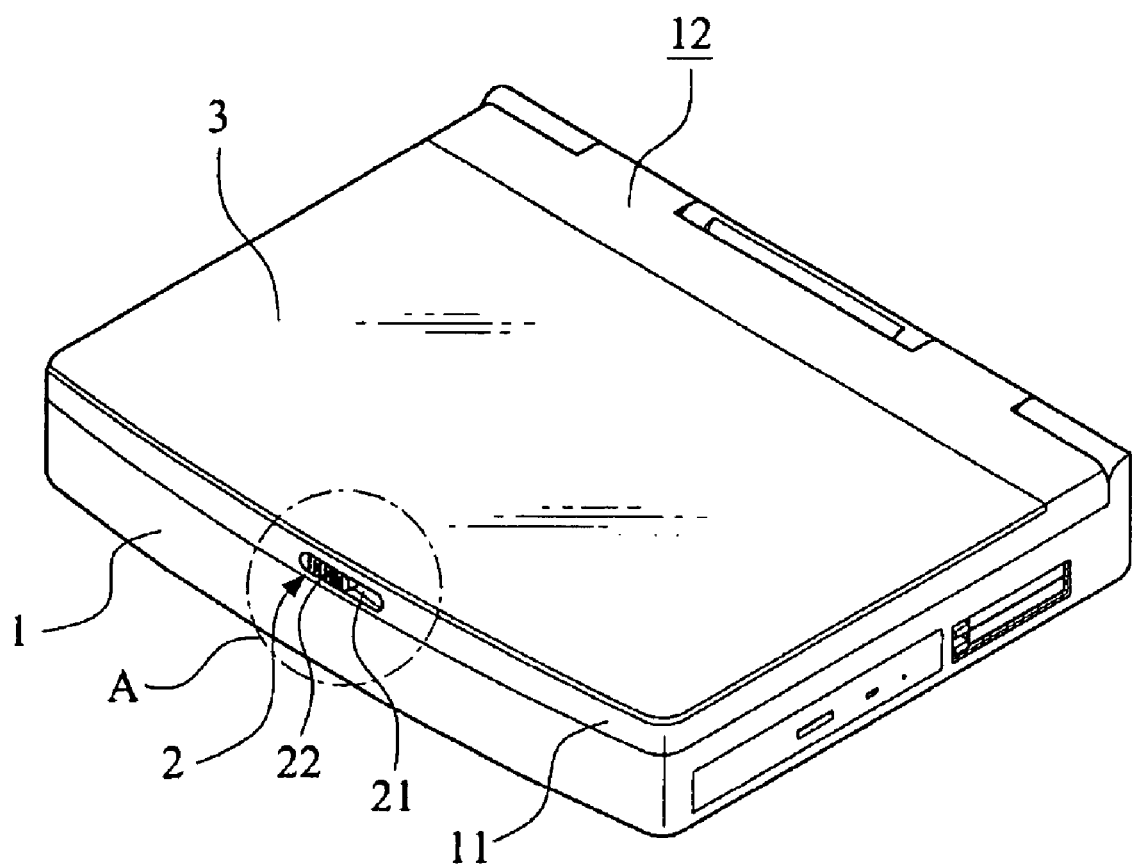
FIG. 9 is an assembled perspective view of a replaceable liquid crystal display (LCD) back plate for portable computer according to a third embodiment of the present invention.
Figure 10:
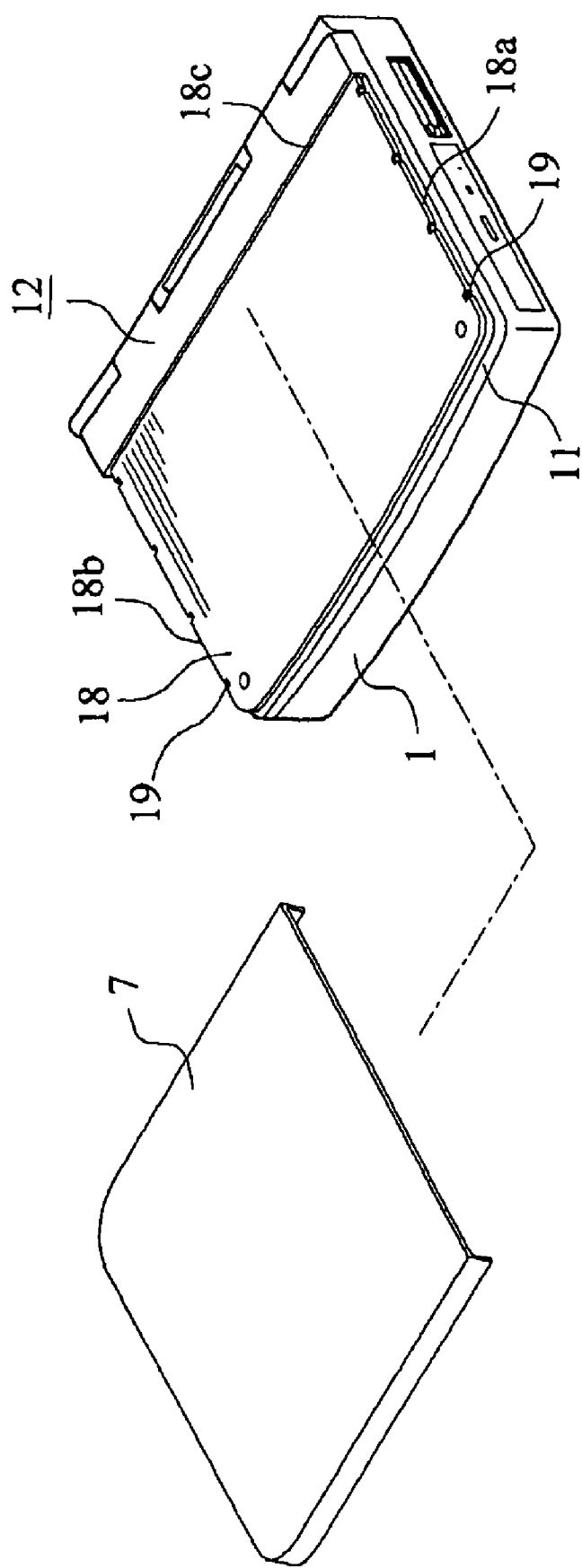
FIG. 10 is an exploded perspective view showing a replaceable cover plate of the LCD back plate for portable computer of FIG. 9 is separated from the LCD back plate.

Please refer to FIGS. 9 and 10 that are assembled and exploded perspective views, respectively, of a replaceable liquid crystal display (LCD) back plate for portable computer according to a third embodiment of the present invention. As shown, the present invention mainly includes a back plate 12 forming part of a housing of a LCD 11 of a portable computer 1. The back plate 12 is provided on an outer surface with a flat area 18, to which a replaceable cover plate 7 is detachably associated via a guide mechanism.

In this embodiment, the flat area 18 occupies the whole area of the outer surface of the back plate 12 of the LCD 11. That is, the flat area 18 has a pair of outer edges 18*a* and 18*b* provided at two opposed laterally outer sides of the flat area 18 on the back plate 12 of the liquid crystal display 11. A number of spaced notches 19 are formed on the outer edges 18*a* and 18*b*.

Figure 11:
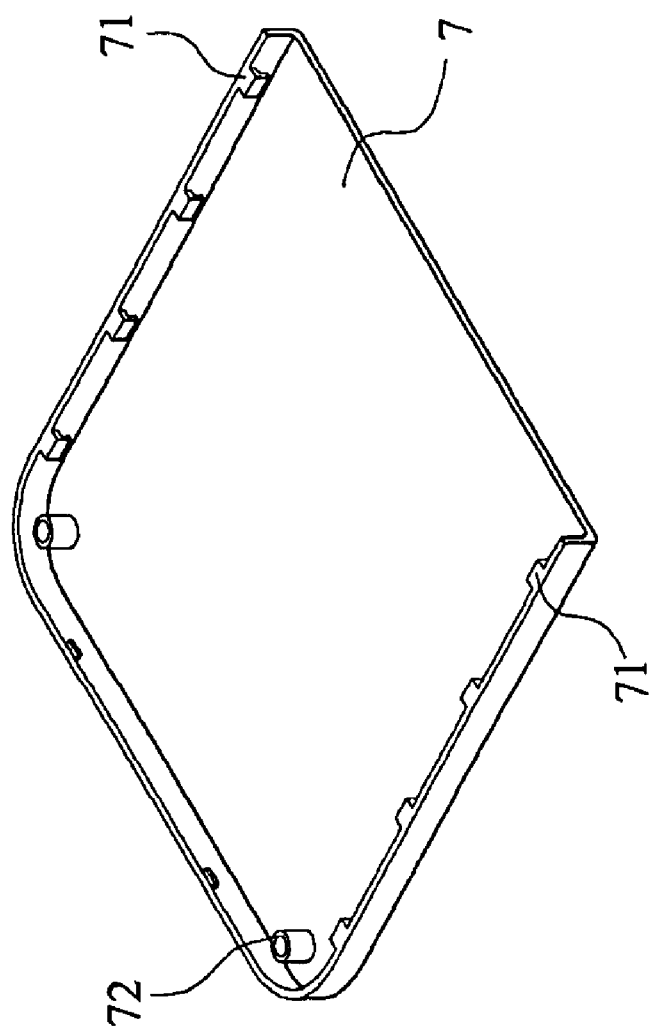
FIG. 11 is a perspective view showing the replaceable cover plate of FIG. 10 is formed with a number of L-shaped tabs provided at two laterally inner sides thereof.

As shown in FIG. 11, a replaceable cover plate 7 is integratedly formed with a number of L-shaped tabs 71 provided at two laterally inner sides of the replaceable cover plate 7 corresponding to the notches 19 formed on the flat area 18 of the back plate 12. The L-shaped tabs 71 of the replaceable cover plate 7 and the outer edges 18*a* and 18*b* of the flat area 18 in combination serve as a guide mechanism for guiding the replaceable cover plate 12 manually slid into and cover on the flat area 18 on the back plate 12.

When the replaceable cover plate 18 is vertically downward set in the flat area 18 on the back plate 12, the L-shaped tabs 71 of the replaceable cover plate 7 pass the notches 19 of the back plate 12 and then the replaceable cover plate 7 is permitted to be horizontally slid in a direction toward a stop edge 18*c* of the flat area 18 along the outer edges 18*a* and 18*b*, so that the replaceable cover plate 7 covers on the flat area 18 of the back plate 12.

Figure 12:
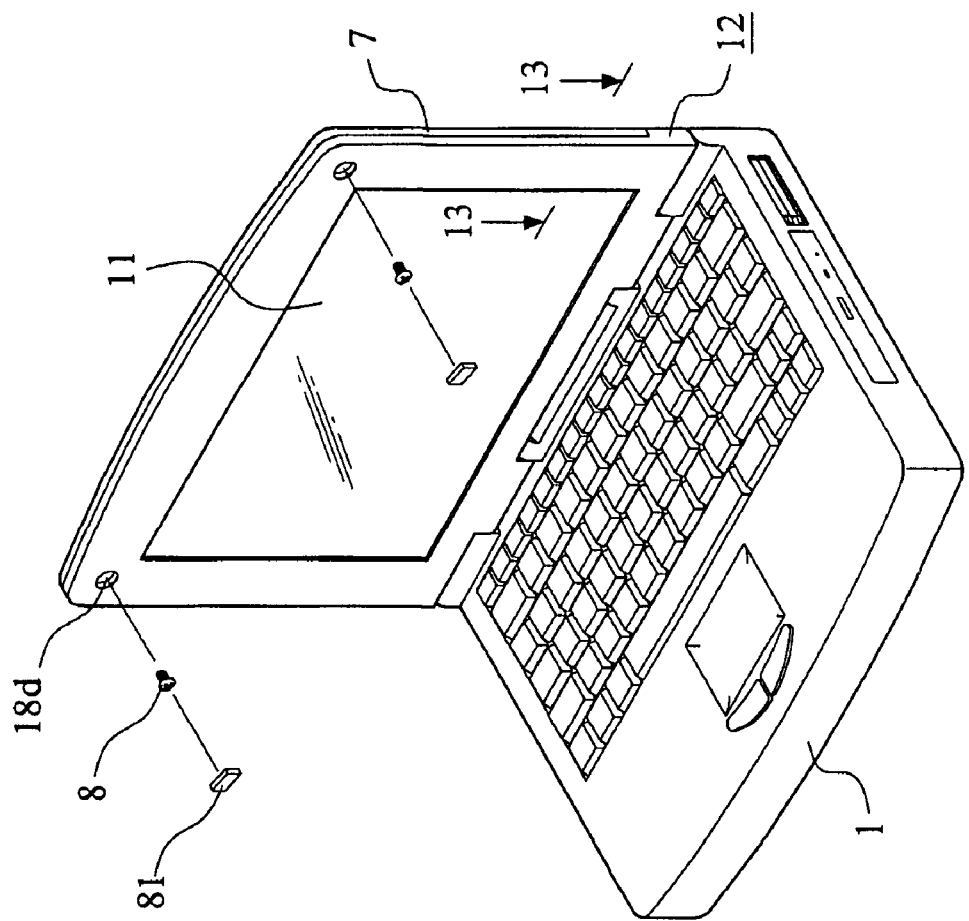
FIG. 12 illustrates the replaceable cover plate covers on the flat area of the back plate, and the replaceable cover plate is further locked in position by means of two locking screws.

FIG. 12 illustrates the replaceable cover plate 7 covers on the flat area 18 of the back plate 12, and the replaceable cover plate 7 may be further locked in position by means of two locking screws 8. The locking screws 8 are screwed through holes 18d provided at predetermined points on the back plate 12 into internally threaded posts 72 correspondingly provided on an inner surface of the replaceable cover plate 7, as shown in FIG. 11, so as to firmly lock the replaceable cover plate 7 to the flat area 18 on the back plate 12 of the liquid crystal display 11. Preferably, the holes 18d may be sealed with a rubber member 81.

Figure 13:
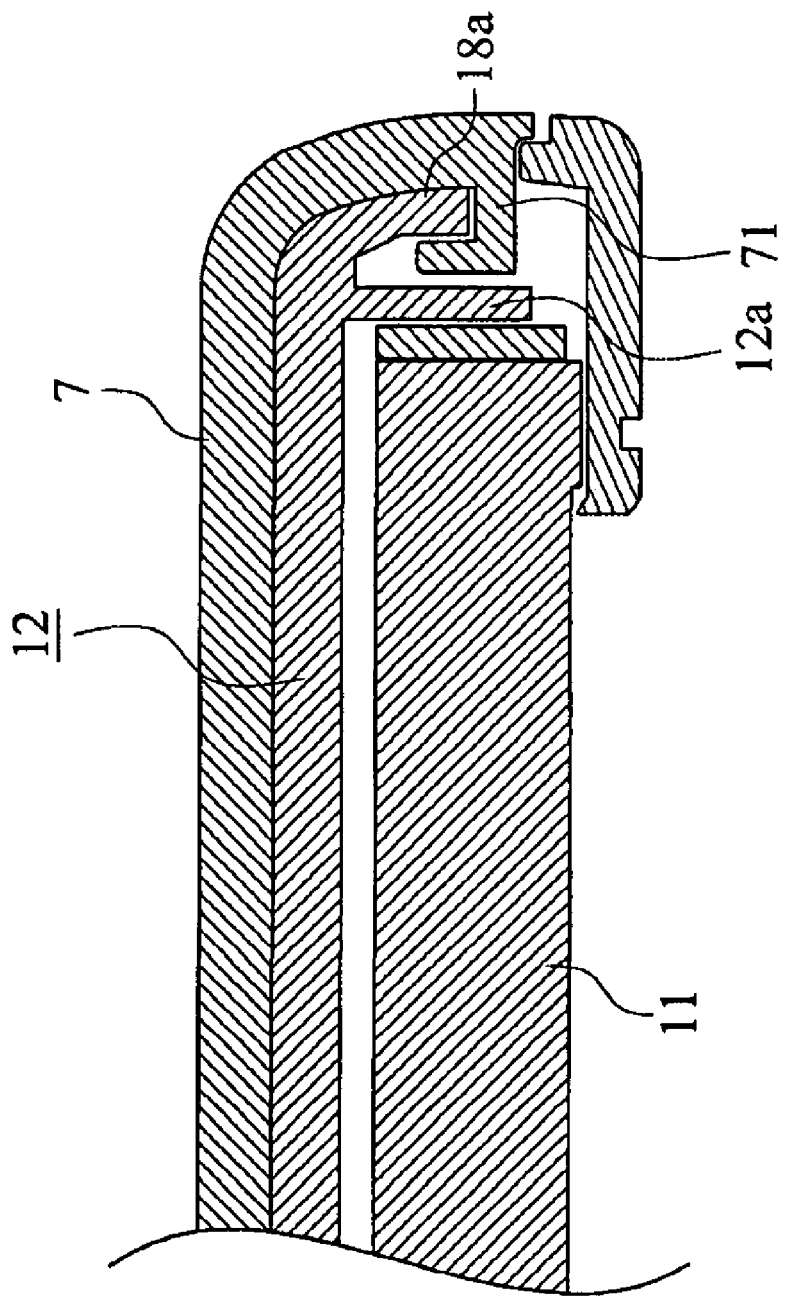
FIG. 13 is a cross-sectional view taken along line 13-13 of FIG. 12.

FIG. 13 is a cross-sectional view taken along line 13-13 of FIG. 12, which shows that an inner side plate 12a extends from the back plate 12 downward and forms a guide way with the outer edge 18*a* of the flat area 18 for the L-shaped tabs 71 of the replaceable cover plate 7.

The replaceable cover plate 7 could be horizontally slid in a direction away from the stop edge 18*c* of the flat area 18 and then vertically separated from the back plate 12 when the L-shaped tabs 71 of the replaceable cover plate 7 pass the notches 19 of the back plate 12.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A replaceable liquid crystal display back plate for a portable computer, comprising:
    a back plate forming part of a housing of a liquid crystal display of the portable computer and being provided on an outer surface with a flat area, the flat area having a pair of outer edges provided at two opposed laterally outer sides of the flat area on the back plate of the liquid crystal display, and a plurality of notches formed on the outer edges;
    a replaceable cover plate adapted to cover the flat area on the back plate; and
    a guide mechanism for guiding the replaceable cover plate manually slid into and cover on the flat area of the back plate, the guide mechanism comprising a plurality of L-shaped tabs provided at two laterally inner sides of the replaceable cover plate corresponding to the outer edges formed on the flat area of the back plate;
    whereby when the replaceable cover plate is vertically downward set in the flat area on the back plate, the L-shaped tabs of the replaceable cover plate pass the notches of the back plate and then the replaceable cover plate is horizontally slid along the outer edges, so that the replaceable cover plate covers on the flat area of the back plate.

2. The replaceable liquid crystal display back plate as claimed in claim 1, wherein the flat area occupies a whole area of the back plate of the liquid crystal display.

3. The replaceable liquid crystal display back plate as claimed in claim 1, further comprising a plurality of locking screws that are screwed through holes provided at predetermined points on the back plate into internally threaded posts correspondingly provided on the replaceable cover plate, so as to lock the replaceable cover plate to the flat area on the back plate of the liquid crystal display.

4. The replaceable liquid crystal display back plate as claimed in claim 3, wherein the holes is sealed with a rubber member.

5. The replaceable liquid crystal display back plate as claimed in claim 1, further comprising an inner side plate extending from the back plate and forming a guide way with the outer edge of the back plate for the L-shaped tabs of the replaceable cover plate.

6. A replaceable liquid crystal display back plate for a portable computer, comprising:
    a back plate forming part of a housing of a liquid crystal display of the portable computer and being provided on an outer surface with a flat area, the flat area having a pair of outer edges provided at two opposed laterally outer sides of the flat area on the back plate of the liquid crystal display, and a plurality of notches formed on the outer edges;
    a replaceable cover plate adapted to cover the flat area on the back plate;
    a plurality of L-shaped tabs provided at two laterally inner sides of the replaceable cover plate corresponding to the outer edges formed on the flat area of the back plate; and
    an inner side plate extending from the back plate and forming a guide way with the outer edge of the back plate;
    whereby when the replaceable cover plate is vertically downward set in the flat area on the back plate, the L-shaped tabs of the replaceable cover plate pass the notches of the back plate and then the replaceable cover plate is horizontally slid along the guide way between the outer edge of the back plate and the inner side plate, so that the replaceable cover plate covers on the flat area of the back plate.

7. The replaceable liquid crystal display back plate as claimed in claim 6, wherein the flat area occupies a whole area of the back plate of the liquid crystal display.

8. The replaceable liquid crystal display back plate as claimed in claim 6, further comprising a plurality of locking screws that are screwed through holes provided at predetermined points on the back plate into internally threaded posts correspondingly provided on the replaceable cover plate, so as to lock the replaceable cover plate to the flat area on the back plate of the liquid crystal display.

9. The replaceable liquid crystal display back plate as claimed in claim 8, wherein the holes is sealed with a rubber member.

* * * * *